US010620855B2

United States Patent
Marripudi et al.

(10) Patent No.: US 10,620,855 B2
(45) Date of Patent: Apr. 14, 2020

(54) SYSTEM AND METHOD FOR AUTHENTICATING CRITICAL OPERATIONS ON SOLID-STATE DRIVES

(71) Applicant: Samsung Electronics Co., Ltd., Suwon-si, Gyeonggi-do (KR)

(72) Inventors: Gunneswara Marripudi, Fremont, CA (US); Ajit Yagaty, Santa Clara, CA (US); Subramanyam Varanasi, San Francisco, CA (US); Vishwanath Maram, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 605 days.

(21) Appl. No.: 15/345,296

(22) Filed: Nov. 7, 2016

(65) Prior Publication Data

US 2018/0067671 A1    Mar. 8, 2018

Related U.S. Application Data

(60) Provisional application No. 62/384,107, filed on Sep. 6, 2016.

(51) Int. Cl.
*H04L 29/06* (2006.01)
*G06F 3/06* (2006.01)
(Continued)

(52) U.S. Cl.
CPC ............ *G06F 3/0622* (2013.01); *G06F 3/067* (2013.01); *G06F 3/0659* (2013.01);
(Continued)

(58) Field of Classification Search
CPC ....... G06F 3/0622; G06F 21/33; G06F 3/0659
See application file for complete search history.

(56) References Cited

U.S. PATENT DOCUMENTS

| 7,155,745 B1 | 12/2006 | Shin et al. |
| 8,086,839 B2 | 12/2011 | Yao et al. |

(Continued)

FOREIGN PATENT DOCUMENTS

| JP | 2004-070875 A | 3/2004 |
| JP | 2010-186286 A | 8/2010 |

OTHER PUBLICATIONS

"Raja Subramani, Bharath Radhakrishnan, Krishnamurthy Puttaiah, Complete Device Level Validation of Solid State Flash Drives—An Approach, Apr. 10-12, 2013, IEEE Xplore, INSPEC#13565004" (Year: 2013).*

(Continued)

*Primary Examiner* — Phy Anh T Vu
(74) *Attorney, Agent, or Firm* — Innovation Counsel LLP

(57) ABSTRACT

A method includes: receiving an operational command directed to a solid-state drive (SSD) and a security credential; issuing an asynchronous event from the SSD to an authentication agent including the security credential and a security certificate, wherein the security certificate is encoded based on the security credential and is stored in the SSD; forwarding the security credential and the security certificate from the authentication agent to an authentication server; validating the security certificate based on the security credential at an authentication server; providing a validation response from the authentication server to the authentication agent; forwarding the validation response from the authentication agent to the SSD; and executing the operational command based on the validation response.

21 Claims, 6 Drawing Sheets

(51) Int. Cl.
*G06F 21/62* (2013.01)
*G06F 21/31* (2013.01)
*G06F 21/33* (2013.01)

(52) U.S. Cl.
CPC ............ *G06F 3/0688* (2013.01); *G06F 21/31* (2013.01); *G06F 21/33* (2013.01); *G06F 21/629* (2013.01); *H04L 63/0823* (2013.01); *H04L 63/0853* (2013.01); *G06F 2221/2101* (2013.01); *H04L 63/0272* (2013.01); *H04L 63/062* (2013.01); *H04L 63/083* (2013.01); *H04L 63/166* (2013.01)

(56) References Cited

U.S. PATENT DOCUMENTS

| | | | |
|---|---|---|---|
| 8,590,040 | B2 | 11/2013 | Ghetie et al. |
| 9,235,719 | B2 | 1/2016 | Neve De Mevergnies et al. |
| 10,079,889 | B1* | 9/2018 | Malwankar ......... H04L 67/2842 |
| 10,282,094 | B2* | 5/2019 | Kachare ................ G06F 3/0605 |
| 2005/0113067 | A1* | 5/2005 | Marcovici ............ H04L 63/062 |
| | | | 455/411 |
| 2008/0155680 | A1 | 6/2008 | Guyot et al. |
| 2013/0219173 | A1* | 8/2013 | Ho ........................... G06F 21/33 |
| | | | 713/157 |
| 2013/0247222 | A1 | 9/2013 | Maksim et al. |
| 2014/0143842 | A1 | 5/2014 | Lo et al. |
| 2014/0213217 | A1* | 7/2014 | Ho .................... H04W 12/0806 |
| | | | 455/411 |
| 2014/0229740 | A1 | 8/2014 | Nagai et al. |
| 2015/0089247 | A1 | 3/2015 | Kang et al. |
| 2015/0205718 | A1* | 7/2015 | Kida .................. G06F 12/0246 |
| | | | 711/103 |
| 2015/0363335 | A1 | 12/2015 | Choi et al. |
| 2015/0378932 | A1* | 12/2015 | Souri ........................ G06F 8/00 |
| | | | 711/209 |
| 2016/0180076 | A1 | 6/2016 | Katieb |
| 2016/0328180 | A1* | 11/2016 | Wang ...................... G06F 13/14 |
| 2016/0328347 | A1* | 11/2016 | Worley ................. G06F 13/385 |
| 2017/0026183 | A1* | 1/2017 | Strong .................. H04L 9/3247 |
| 2017/0033930 | A1* | 2/2017 | Costa .................... H04L 9/3247 |
| 2018/0284990 | A1* | 10/2018 | Kachare ............... G06F 3/0605 |
| 2018/0307650 | A1* | 10/2018 | Kachare ............... G06F 15/167 |
| 2019/0050289 | A1* | 2/2019 | Kachare ............. G06F 11/1076 |
| 2019/0187922 | A1* | 6/2019 | Marley ................... G06F 13/16 |

OTHER PUBLICATIONS

"Raja Subramani, Ramya Penneru, GLamar Selvaraj, Bharath Radhakrishnan, Krishnamurthy Puttaiah, Coverage Metrics for Device Level Validation of SATA and SAS Devices—An Approach, Jan. 27-29, 2014, IEEE Xplore, INSPEC#15507847" (Year: 2014).*

"Ziye Yang, Changpeng Liu, Yanbo Zhou, Xiaodong Liu, Gang Cao, SPDK Vhost-NVMe: Accelerating I/Os in Virtual Machines on NVMe SSDs via Uer Space Vhost Target, Nov. 18-21, 2018, IEEE Xplore, INSPEC#18343952" (Year: 2018).*

* cited by examiner

SYSTEM AND METHOD FOR AUTHENTICATING CRITICAL OPERATIONS ON SOLID-STATE DRIVES

CROSS-REFERENCE TO RELATED APPLICATION(S)

This application claims the benefits of and priority to U.S. Provisional Patent Application Ser. No. 62/384,107 filed Sep. 6, 2016, the disclosure of which is incorporated herein by reference in its entirety.

TECHNICAL FIELD

The present disclosure relates generally to solid-state drives (SSDs), more particularly, to a system and method for authenticating critical operations on SSDs.

BACKGROUND

Solid-state drives (SSDs) support a set of commands that are used for administrative purposes. Some of these administrative commands are disruptive in nature and can result in an irrecoverable loss of data. Examples of these disruptive commands are a format command, a namespace deletion command, a firmware update command, etc. The format command releases logical block addresses (LBAs) on an SSD and clears the contents of the LBAs. The namespace deletion command releases the LBAs pertaining to a namespace specified in the command. The firmware update command updates the operational firmware on the SSD.

These disruptive administrative commands can be executed only by users with root privileges. Typically, the root privileges are the only security layer available for validating administrative commands. FIG. 1 shows a prior art authentication scheme 100 for executing an administrative command. An administrative command 111 can be issued to an SSD 130 using a command line interface (CLI) of a command line utility program or an application from a host operating system (OS) 110. The command line utility or the application may run in a user space of the host operating system. The administrative command 111 is sent to a device driver 120 that manages the control and operations of the SSD device 130. The device driver 120 may be running in a kernel space or a user space of the host operating system. The device driver 120 passes the administrative command 111 to the firmware of the SSD 130. The SSD firmware carries out the actual operation on the SSD 130 as instructed by the administrative command 111. Upon completion of the administrative command 111, the SSD firmware sends back a response 121 (e.g., success or failure) to the device driver 120. The device driver 120 then send the response 121 back to the host OS 110 from which the administrative command 111 is issued.

Traditionally, only a root-privileged user can initiate critical operation commands. If the root privileges are compromised, such critical operation commands can lead to irrecoverable data loss. The prior art authentication scheme 100 of FIG. 1 assumes that the command is already authenticated and has the necessary permissions. These administrative commands are usually configured as "privileged" operations. The runtime environment of the host OS 110 checks for the appropriate privileges (e.g., super-user) to execute the commands. The prior art authentication scheme 100 is vulnerable due to a lack of a preventive mechanism to stop a disruptive command issued with a malicious intent if the user credentials are compromised. The SSD 130 does not have any mechanism to ensure that the command issued is an intended one. A compromised administrative command issued to an SSD can lead to a permanent and irreversible data loss on the SSD.

Even a legitimate user can accidentally execute an administrative command by mistake. In this case, the SSD has no level of confirmation to ensure that a disruptive operation is indeed an intended one. For example, legitimate but unintended administrative commands can be accidentally issued in larger setups where a number of SSDs are deployed on multiple servers in a cluster.

SUMMARY

According to one embodiment, a method includes: receiving an operational command directed to a solid-state drive (SSD) and a security credential; issuing an asynchronous event from the SSD to an authentication agent including the security credential and a security certificate, wherein the security certificate is encoded based on the security credential and is stored in the SSD; forwarding the security credential and the security certificate from the authentication agent to an authentication server; validating the security certificate based on the security credential at an authentication server; providing a validation response from the authentication server to the authentication agent; forwarding the validation response from the authentication agent to the SSD; and executing the operational command based on the validation response.

According to another embodiment, a method includes: receiving an operational command directed to a solid-state drive (SSD) from a user; posing challenge questions to the user; receiving user-provided answers to the challenge questions; comparing the user-provided answers and answers to the challenge questions associated with the user; and executing the operational command based on a comparison result between the user-provided answers and the answers.

According to another embodiment, a solid-state drive (SSD) includes one or more non-volatile memory devices; an interface to a host computer; and a firmware driver. The firmware driver is configured to: receive an operational command and a security credential via the interface; issue an asynchronous event to an authentication agent including the security credential and a security certificate, wherein the security certificate is encoded based on the security credential and is stored in the SSD; receive a validation response from the authentication agent; and execute the operational command based on the validation response.

According to yet another embodiment, an authentication system includes: an authentication server; a host computer running an authentication agent; and a plurality of SSDs. The authentication agent establishes a secure communication channel with the authentication server during initialization. Each of the plurality of SSDs includes a firmware driver that is configured to: receive an operational command and a security credential via a device driver running in the host computer; issue an asynchronous event to the authentication agent including the security credential and a security certificate, wherein the security certificate is encoded based on the security credential and is stored in the SSD. The authentication server is configured to validate the security certificate and provides a validation response to the authentication agent over the secure communication channel. The firmware driver of each of the plurality of SSDs is further configured to execute the operational command based on the validation response.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
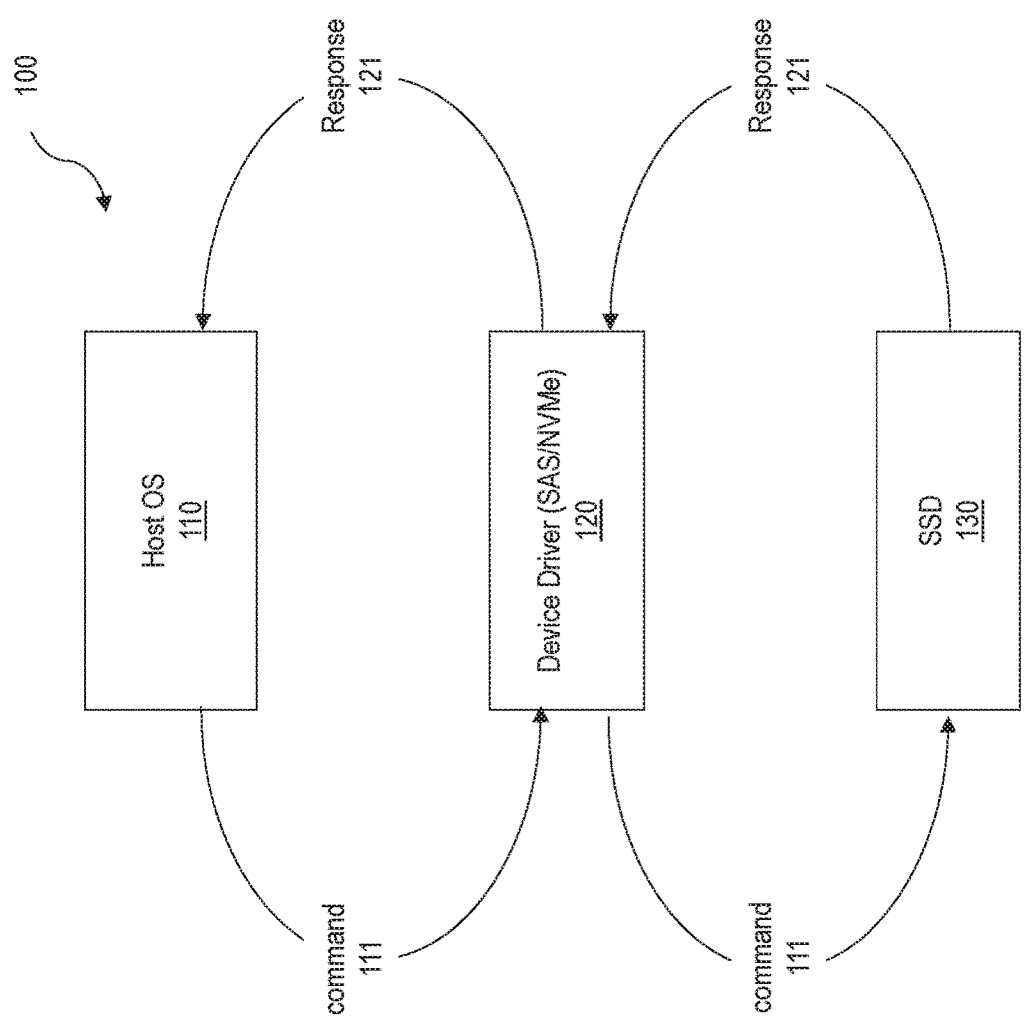
FIG. 1 shows a prior art authentication scheme for executing an administrative command.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for authenticating critical operations on an SSD. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a solid-state drive (SSD) with an embedded firmware that can authenticate critical operations at a device level. The embedded firmware of the SSD interacts with a trusted entity, for example, an authentication server, and executes only authenticated operations by the authentication server. The SSD participates in an authentication process by interacting with trusted external entities. In addition, the present disclosure describes a process for passing security credentials as a part of an operation command for the SSD to verify credentials associated with the operation command. In accordance with the present disclosure, critical operations can be safely validated at the SSD-level to avoid disruptions that can lead to unintended loss of data stored in the SSD.

The present system and method for authenticating critical operations can be applied to SSDs. The present system and method further provides an auditing scheme for the SSDs to log the data about critical operations for future troubleshooting. For example, an SSD can maintain a time log of critical operation requests including, but not limited to, critical operation commands, user credentials, response received from the authentication server as well as the result of the operation and response to the client issuing the critical operation commands. A host computer can retrieve the log information according to an appropriate protocol with the SSD to monitor unwarranted operations on the SSDs for troubleshooting or auditing purposes. The present system and method can eliminate the risk of accidental data loss due to an operator error and the breach of access to an authentication server.

The present system and method can provide a device-level authentication for critical operations on an SSD. Examples of such critical operations include, but are not limited to, a format command (e.g., a secure erase), a deletion command for a namespace on a network-connected SSD (e.g., non-volatile memory express (NVMe)-compatible SSD and NVMe over fabrics (NVMeoF)-compatible SSD). These critical operations can result in irrecoverable data loss. The present system and method provides a mechanism at the SSD-level to prevent malicious intent.

According to one embodiment, the firmware of an SSD can authenticate a user-issued command by interacting with an authentication server. The user-issued command can include security credentials. The security credentials are sent to the SSD along with the user-issued command. The SSD firmware passes the user-provided security credentials and a certificate that is stored on the SSD during an initialization to the authentication server for validation. The SSD firmware executes the user-issued command based on a validation response from the authentication server.

Figure 2:
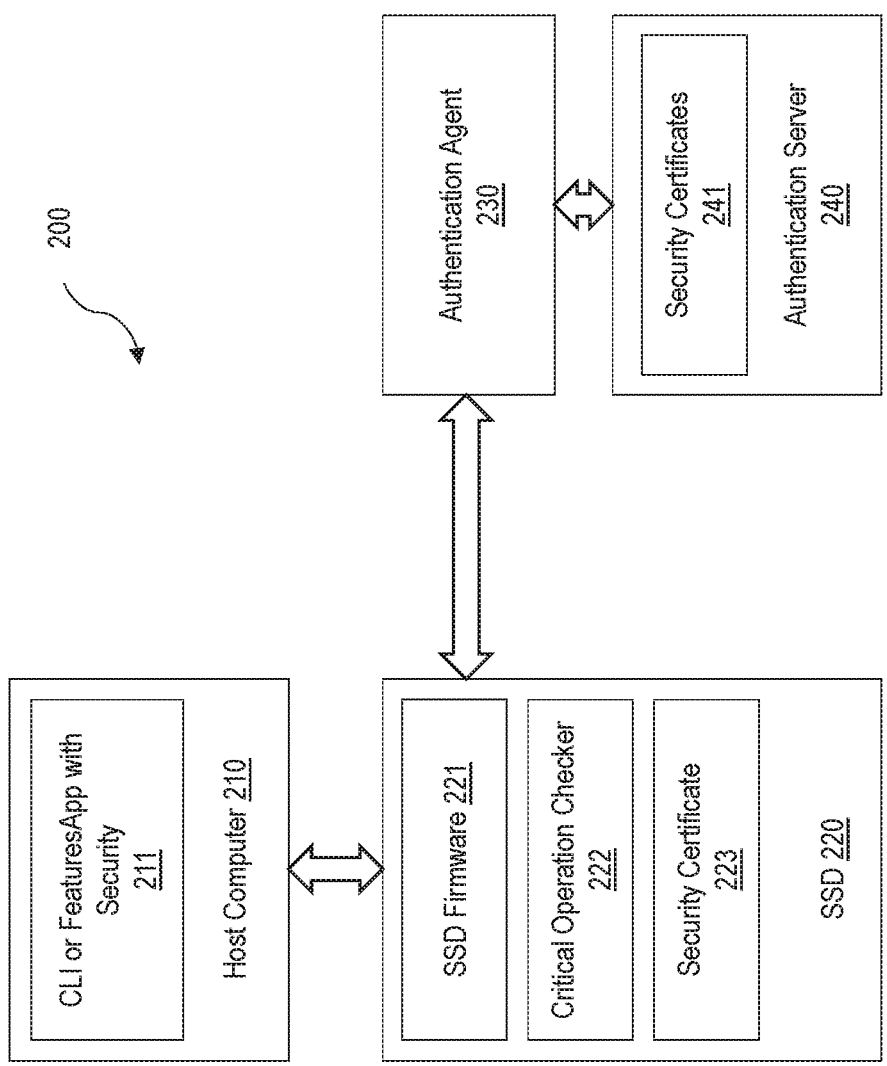
FIG. 2 illustrates a block diagram of an example authentication system for validating and executing a critical operation command.

FIG. 2 illustrates a block diagram of an example authentication system for validating and executing a critical operation command, according to one embodiment. The authentication system 200 includes a host computer 210 on which a command line utility or an application 211 is running, an SSD 220, an authentication agent 230, and an authentication server. The SSD 220 may include one or more non-volatile memory devices, an interface to a host computer, and a firmware driver herein also referred to as an SSD firmware 221. An authorized administrative user (e.g., super-user) can issue administrative command to the SSD 220 via the command line utility or an application 211. The command line utility or the application 211 can interact with the SSD 220 via a device driver of the SSD 220 that runs on the host computer 210. The SSD 220 can be physically connected to the host computer 210 (e.g., serial attached SCSI (SAS), serial AT attachment (SATA), and peripheral component interconnect (PCI)) or connected to the host computer 210 over a network such as an Ethernet network. The device driver for the SSD 220 may be running in a kernel space or a user space of the host operating system. In addition to the administrative command, the command line utility or the application 211 passes security credentials. According to one embodiment, the administrative user can input the security credentials when issuing the administrative command.

The SSD 220 has a firmware 221 that can extract a command from a command queue and executes the extracted command. The SSD 220 can further have a critical operation checker 222. The critical operation checker 222 can process critical operations received from host computer 210 in conjunction with an authentication server 240. In the present example, the critical operation checker 222 can be a part of the SSD firmware 221, however the critical operation checker 222 can implemented as a different hardware or firmware logic within the SSD 220. In other embodiments, the critical operation checker 222 can be implemented separately residing outside of the SSD 220 and connected to one or more SSDs to process critical operations.

To validate the command prior to executing the command, the critical operation checker 222 interacts with the authentication server 240. According to one embodiment, the SSD firmware 221 has authentication capabilities and interacts with the authentication server 240 via an authentication agent 230. In one embodiment, the authentication agent 230 may be running on the host computer 210 to which the SSD 220 is connected. In other embodiments, the authentication agent 230 may be running on a different computer that is connected to the host computer 210 via a network. The authentication server 240 may be a different computer other than the host computer 210 to which the SSD 220 is connected. The communication between the SSD firmware 221 and the authentication server 240 via the authentication agent 230 may be encrypted for enhanced security.

According to one embodiment, the SSD firmware 221 generates an asynchronous authentication event for authenticating the user-issued command to the authentication agent 230. The asynchronous event including the security credentials received from the command line utility or the application 211 and a security certificate 223 that is locally stored to the SSD 220. The SSD firmware 221 waits for a response from the authentication agent 230 for a validation result. If the response indicates a successful validation, the SSD firmware 221 locally executes the command onto the SSD 220. The SSD firmware 221 also sends a success or a failure status back to the command line utility or the application 211 via the device driver.

According to one embodiment, the authentication agent 230 is a service that runs on a host computer. The SSD 220 can be physically connected to the host computer over various interface protocols such as SAS, SATA, and PCI. Each host computer may have one or more SSDs connected thereto. In the case where the SSD 220 is a network-connected SSD (e.g., NVMeoF-compatible SSD), the SSD 220 is connected to the host computer over a network and can act as its own authentication agent 230. The network-connected SSD may act as its own authentication agent 230, or a separate node in the network (e.g., a computer or another SSD) may serve as an independent authentication agent. During the initialization, the host computer running the authentication agent 230 establishes communication with the network-connected SSD via a mutually agreed protocol (e.g., NVMeoF). The device driver of the host computer passes along critical operation commands to the network-connected SSD over the network via the mutually agreed protocol (e.g., NVMeoF). In return, the network-connected SSD communicates with the authentication agent 230 running on the host computer over the network via the mutually agreed protocol (e.g., NVMeoF). In this case, the authentication agent 230 acts as a gateway between the SSD 220 and the authentication server 240.

The authentication server 240 stores a plurality of validated security certificates 241 that are used for validating critical operations for the SSD 220. During the startup, the authentication server 240 may inform the SSD 220 of a list of critical SSD operations. The authentication server can also send the command/operation identifiers that are marked as a critical SSD operation. The SSD 220 can trigger the critical operation checker 222 only for commands that are marked as a critical SSD operation, not for all I/O operations, to minimize or avoid performance degradation of the system.

On startup, the authentication agent 230 registers for a series of asynchronous events for command authentication on all of the SSDs that are connected, either physically or over a network, to the host computer 210. In addition, the authentication agent 230 establishes a secure communication channel with the authentication server 240 using a security scheme. For example, the security scheme used for secure communication between the authentication agent 230 and the authentication server 240 can be secure sockets layer (SSL) or transport layer security (TLS). When an asynchronous event is posted by one of the SSDs, the authentication agent 230 relays the security credentials and a certificate associated with the SSD to the authentication server 240 and awaits a validation response. After receiving the response from the authentication server 240, the authentication agent 230 passes the validation response to the SSD 220 via an I/O control (IOCTL) call or similar functionality as provided by the operating system.

According to one embodiment, the authentication server 240 is a central service that performs cluster-wide command authentication. The authentication server 240 has the capability to support various validation schemes using passphrase/hash and challenge/response methods (amongst others). During the initial configuration, the administrative user can choose one of the validation schemes and configure either the passphrase or challenge/response parameters into the authentication server 240. The authentication server 240 stores these parameters persistently in a database. In some embodiments, a plurality of authentication agents running in a cluster interface can directly with the authentication server 240. As a part of an execution sequence of a user-issued command, the authentication agent 230 sends the security credentials obtained from the administrative user to the authentication server 240. The authentication server 240 then processes the security credentials, validates the credentials, and sends a response to the authentication agent 230.

Figure 3:
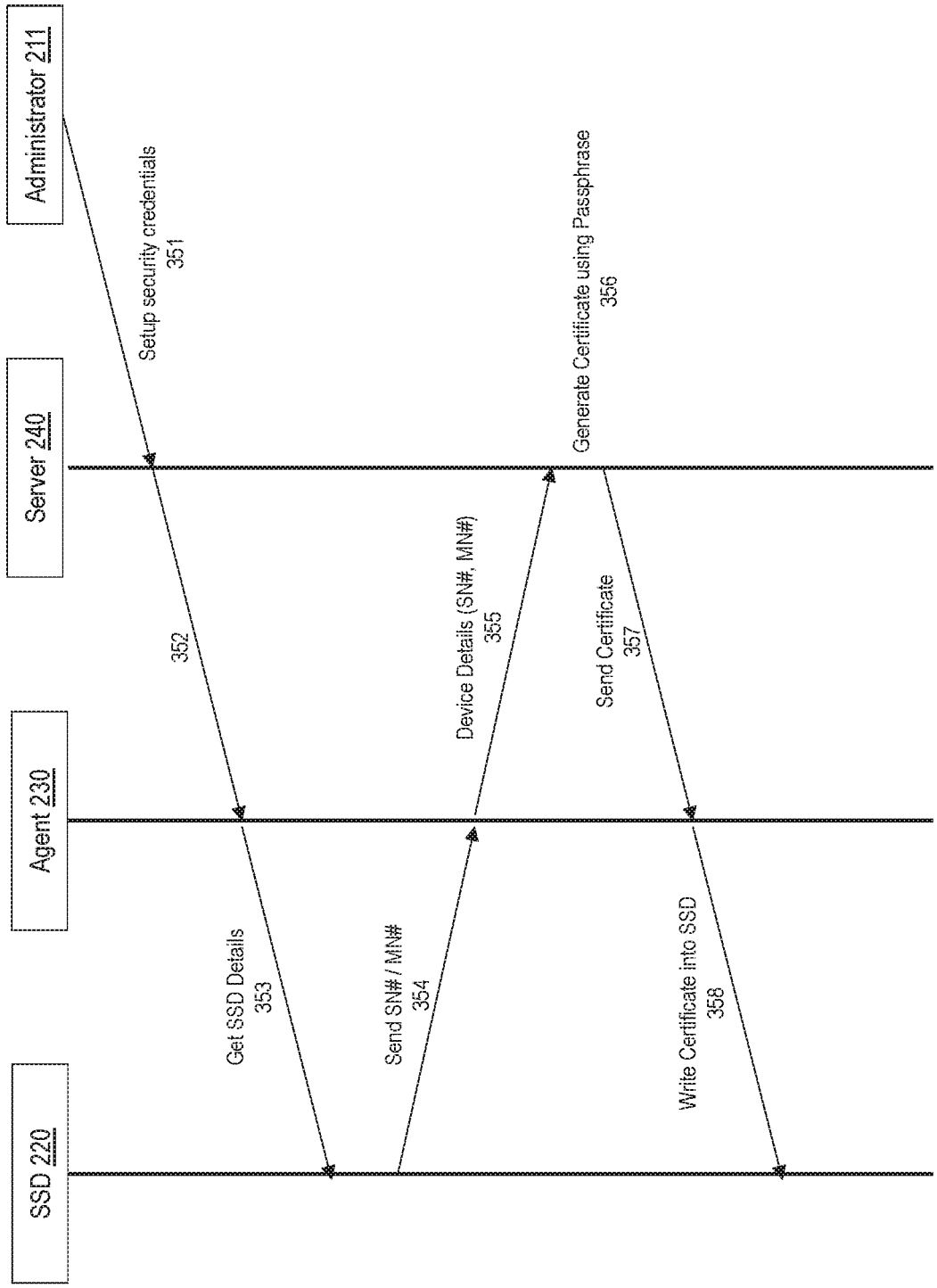
FIG. 3 shows an example process for initializing an authentication system, according to one embodiment.

FIG. 3 shows an example process for initializing an authentication system, according to one embodiment. The entities of the authentication system 200 shown in FIG. 2 including the host computer 210, the SSD 220, the authentication agent 230, and the authentication server 240 must go through the initialization process before the authentication system 200 is ready to securely handle user commands.

Initially, an administrator 211 sets up security credentials (e.g., authentication paraphrase or challenge questions) for the SSDs that are connected to a host computer (not shown) including a target SSD 220 (351). When setting up the security credentials, the administrator 211 may use the host computer 210 or any other computer that can communicate with the authentication server 240, for example, over a network. These security credentials are later used when executing some critical administrative commands issued to the SSD 220. The authentication server 240 notifies and requests the authentication agent 230 to establish communication with the local SSDs including the target SSD 220 (352). For example, the authentication agent 230 scans the local SSDs (353) and retrieves an ID number of the SSDs such as a serial number and a model number from the SSD 220 (354). The authentication agent 230 sends the retrieved SSD-specific details to the authentication server 240 (355). Using the received SSD-specific details, the authentication server 240 generates a security certificate for each of the local SSDs (356).

The authentication server 240 can generate the security certificate based on an encoding scheme. According to one embodiment, the security credentials (e.g., authentication passphrase or challenge questions) configured by the administrator are used as a key in the encoding process. The security certificate is then sent to the authentication agent 230 (357), and the authentication agent 230 sends the security certificate to the SSD 220 via an IOCTL call or a similar functionality as provided by the operating system. The SSD 220 stores the security certificate as metadata and uses it for authenticating administrative commands (358). Via the authentication agent 230, the authentication server 240 may inform the SSD 220 of critical operations that are to be handled by the critical operation checker.

According to one embodiment, a certificate-based scheme is used for validating an administrative command. In this case, the administrator 211 can send a passphrase that is used by the administrator 211 as a key to the encoding scheme employed by the authentication server 240. The authentication server 240 generates the security certificate for the SSD 220 using the administrator-provided passphrase. The security certificate (e.g., security certificate 223 of FIG. 2) is locally stored on the SSD 220.

After the initialization, a user issues an administrative command along with a passphrase. The user may be the administrator 211 or any other user who is entitled to send an administrative command. Both the security certificate stored in the SSD 220 and the user-provided passphrase are sent to the authentication server 240. The authentication server 240 decodes the security certificate using the user-provide passphrase and compares the decoded security certificate with the validated security certificate stored in the database. Upon successful validation of the certificate, the SSD 220 executes the command and sends a response to the user.

According to another embodiment, a challenge-response scheme is used for validating an administrative command. As a part of the authentication server configuration, the administrator 211 can configure a set of challenge questions and their responses. When a user issues an administrative command, the SSD 220 retrieves one or more challenge questions from the authentication server 240 and pose them to the user. Upon successful execution of the challenge-response sequence, the SSD 220 completes the command.

Figure 4:
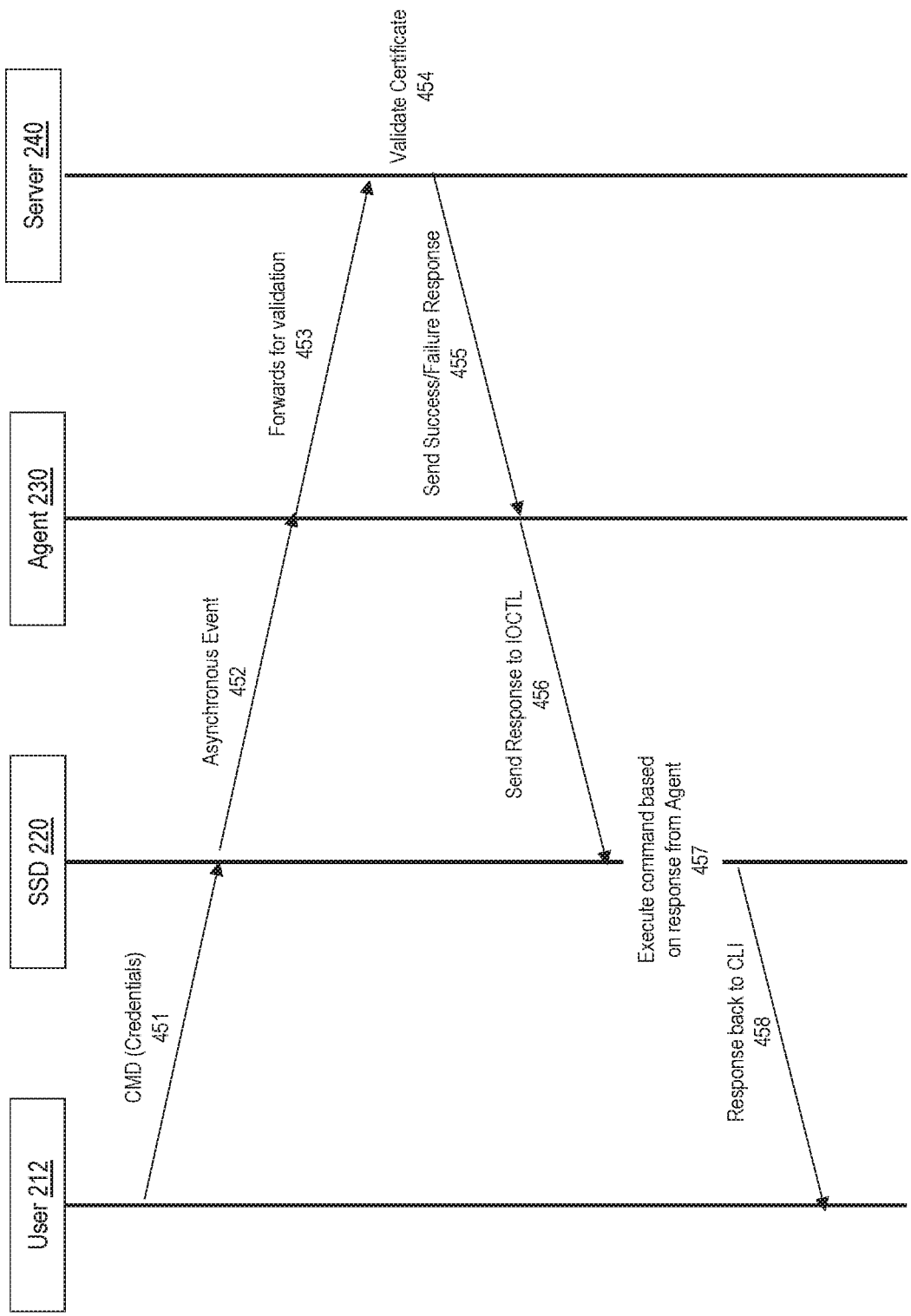
FIG. 4 shows an example process for validating an administrative command, according to one embodiment.

FIG. 4 shows an example process for validating an administrative command, according to one embodiment. A user 212 issues an administrative command via a command line interface (CLI) of a command line utility or an application along with security credentials (e.g., authentication passphrase) (451). The administrative command and the security credentials are passed in a command structure to the firmware of the SSD 220 via a device driver running on the host computer to which the SSD 220 is connected. In case of Ethernet SSD, the administrative command and the security credentials are passed to the firmware of the SSD 220 via the initiator instead of the device driver.

The SSD firmware extracts the security credentials passed in the command structure, and reads the SSD certificate stored on the SSD during the initialization. The SSD firmware passes a tuple of <security certificate, security credentials> to the authentication agent 230 via an asynchronous event notification and awaits a response (452). In other embodiments, a critical operation checker checks whether the administrative command received from the user 212 is a critical operation as indicated by the authentication server 240 and sends an asynchronous event to the authentication agent 230 for validation only those administrative commands that are marked as a critical operation.

During the initialization, the authentication agent 230 registers for asynchronous event notifications from every SSD that is connected to a target node (or a host computer) and establishes a communication channel with the authentication server 240. In response to an asynchronous notification event from the firmware of the SSD 220, the authentication agent 230 passes the tuple of <security certificate, security credentials> to the authentication server 240 for validation (453).

The authentication server 240 receives a message from an authentication agent 230 to authenticate an administrative command and decrypts the security certificate using the security credentials passed by the authentication agent 230. The authentication server 240 validates the decrypted security certificate by comparing it with the security certificate stored in its database (454).

Based on the validation result, the authentication server 240 sends a success or a failure message to the authentication agent 230 (455). The authentication agent 230 relays the response from the authentication server 240 back to the SSD firmware (456). In one embodiment, the response from the authentication agent 230 to the SSD 220 is sent via a vendor-specific command such as an IOCTL call or a similar functionality provided by the operating system. If the command has been authenticated successfully, the SSD 220 executes the administrative command (457). The appropriate status is sent back to the user 212 who initiated the administrative command (458).

Figure 5:
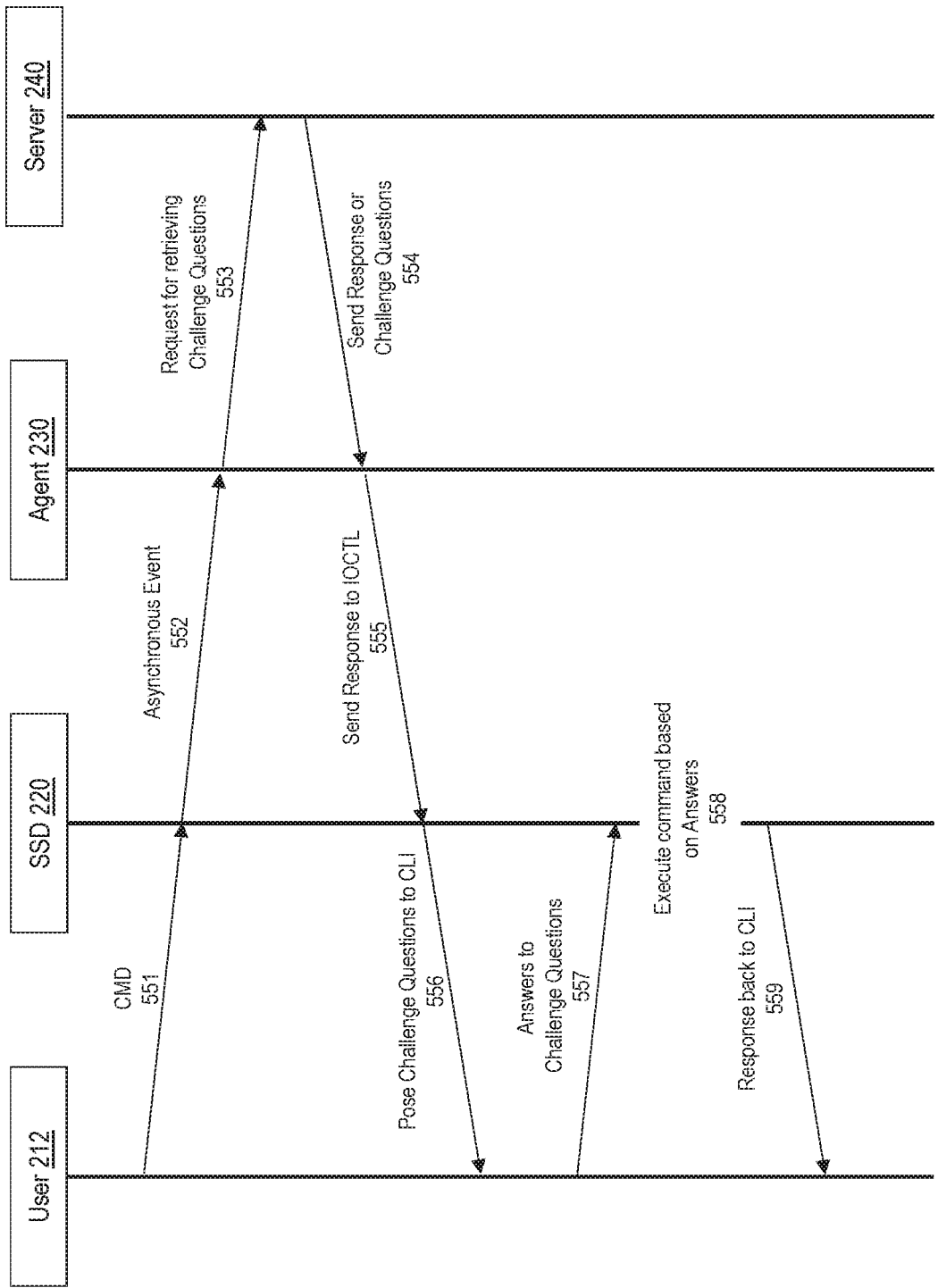
FIG. 5 shows an example process for validating an administrative command, according to another embodiment.

FIG. 5 shows an example process for validating an administrative command, according to another embodiment. A user 212 issues an administrative command via a command line interface (CLI) of a command line utility or an application (551). The administrative command is passed in a command structure to the firmware of the SSD 220 via a device driver running on the host computer to which the SSD 220 is connected. In case of Ethernet SSD, the administrative command is passed to the firmware of the SSD 220 via the initiator instead of the device driver.

The SSD firmware identifies answers to security questions associated with the user 212. In one embodiment, the answers to the security questions are stored on the SSD during the initialization. The SSD firmware passes an identifier of the user 212 to the authentication agent 230 via an asynchronous event notification and awaits a response (552).

During the initialization, the authentication agent 230 registers for asynchronous event notifications from every SSD that is connected to a target node (or a host computer) and establishes a communication channel with the authentication server 240. In response to an asynchronous notification event from the firmware of the SSD 220, the authentication agent 230 send a request to the authentication server 240 to retrieve challenge questions that are associated with the user 212 (553).

The authentication server 240 receives the request for challenge questions from the authentication agent 230 and passes a response or one or more challenge questions to the authentication agent 230 (554). If the identity of the user 212 is not verified, the authentication server 240 sends a response instructing the agent 230 to disapprove the administrative command. If the user 212 is a verified user, the authentication agent 230 relays the one or more challenge questions to the SSD firmware (555). In one embodiment, the response from the authentication agent 230 to the SSD 220 is sent via a vendor-specific command such as an IOCTL call or a similar functionality provided by the operating system. The SSD 220 poses the one or more challenge questions to the user 212 via the CLI (556). The user 212 provides answers to the challenge questions (557). If the answers match the stored answers in the SSD 220, the SSD 220 executes the administrative command (558). If the answers do not match, the SSD 220 aborts the administrative command. The SSD 220 finally sends a response back to the user 212 via the CLI (559). It is noted that the challenge questions are stored remotely in the authentication server 240, and the answers to the challenge questions are stored locally in the SSD 220. The separate storage of the challenge questions and the answers can provide more secure validation of the administrative command.

In another embodiment, the SSD 220 retrieves and poses challenge questions in response to a user 212's administrative command (556). In this case, the SSD 220 stores the security questions and the associated answers during the initialization such that the steps 552-555 may be bypassed. The authentication server 240 may store a duplicate copy of the security questions and the associated answers and communicate with the SSD 220 directly via the authentication agent 230 to monitor unwarranted operations on the SSDs for troubleshooting or auditing purposes. The monitoring of unwarranted operations on the SSDs by the authentication server 240 may be done asynchronously when the SSD 220 is idling to minimize the performance degradation of the system.

Figure 6:
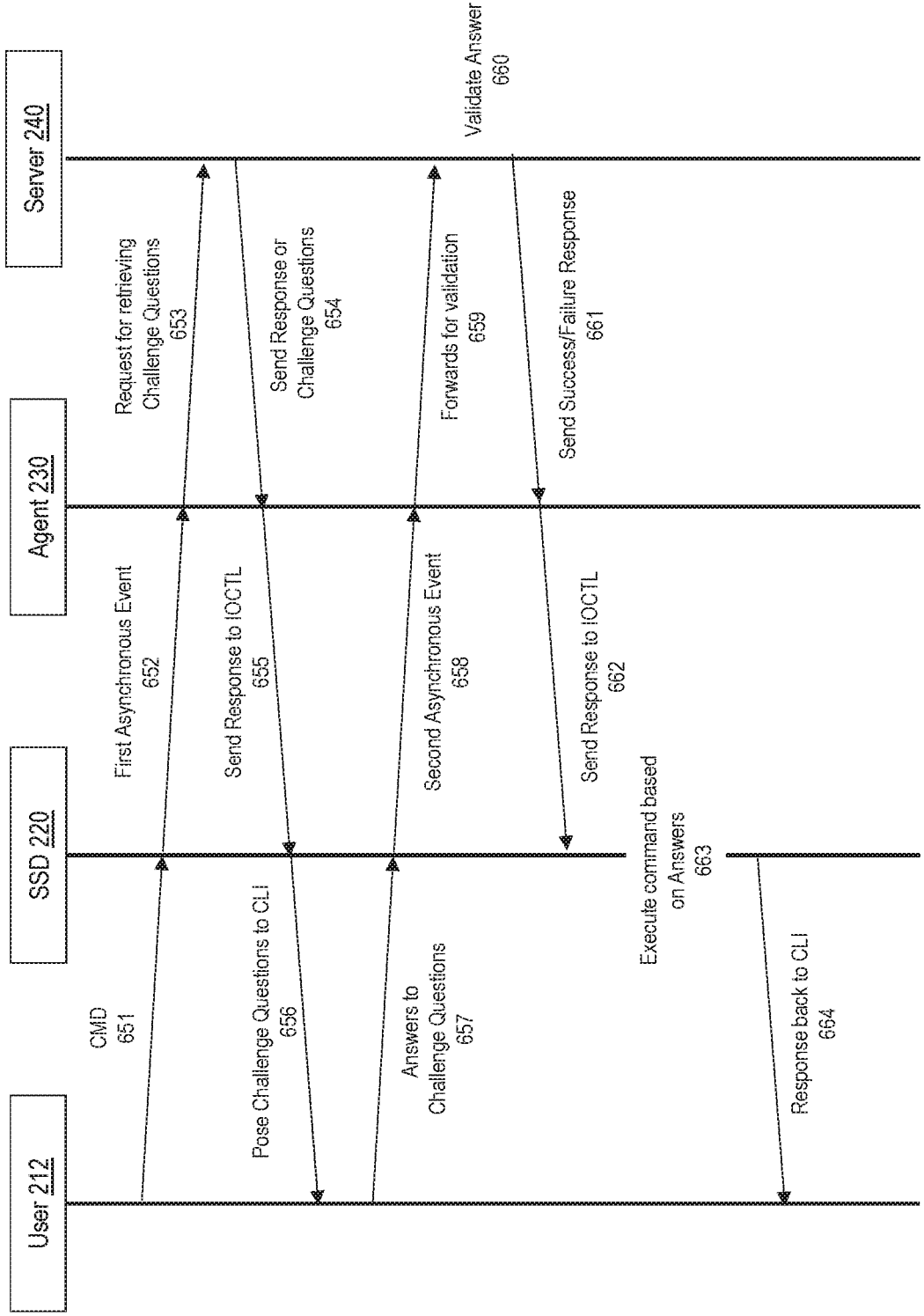
FIG. 6 shows an example process for validating an administrative command, according to another embodiment.

FIG. 6 shows an example process for validating an administrative command, according to another embodiment. In this case, the SSD 220 stores neither the security questions nor answers locally. A user 212 issues an administrative command via a command line interface (CLI) of a command line utility or an application (6510). The SSD firmware passes an identifier of the user 212 to the authentication agent 230 via a first asynchronous event notification and awaits a response (652). In response to an asynchronous notification event from the firmware of the SSD 220, the authentication agent 230 send a request to the authentication server 240 to retrieve challenge questions that are associated with the user 212 (653). The authentication server 240 receives the request for challenge questions from the authentication agent 230 and passes a response or one or more challenge questions to the authentication agent 230 (654). The authentication agent 230 relays the one or more challenge questions to the SSD firmware (655). The SSD 220 poses the one or more challenge questions to the user 212 via the CLI (656) and receives answers to the challenge questions from the user 212 (657). The SSD firmware passes the user-provided answers to the authentication agent 230 via a second asynchronous event notification and awaits a response (658). The authentication agent 230 passes the user-provided answers to the authentication server 240 (659). The authentication server 240 validate the answers by comparing the user-provided answers with the locally-stored verified answers to the authentication questions (660). Based on the validation result, the authentication server 240 sends a success or a failure message to the authentication agent 230 (661). The authentication agent 230 relays the response from the authentication server 240 back to the SSD firmware (662). The SSD 220 determines to execute the administrative command based on the response received from the authentication server (663). The appropriate status is sent back to the user 212 who initiated the administrative command (664).

According to one embodiment, the SSD described herein may be an Ethernet SSD that can be directly plugged into an Ethernet network. The SSD may be compatible with conventional underlying storage protocols such as SAS, SATA, and PCI. The present authentication scheme can be applicable to any non-volatile storage media that stores large amounts of data. The present authentication scheme is applicable to various disruptive critical operations including, but not limited to, creation, resizing, and deletion of an NVMe namespace.

According to one embodiment, a method includes: receiving an operational command directed to a solid-state drive (SSD) and a security credential; issuing an asynchronous event from the SSD to an authentication agent including the security credential and a security certificate, wherein the security certificate is encoded based on the security credential and is stored in the SSD; forwarding the security credential and the security certificate from the authentication agent to an authentication server; validating the security certificate based on the security credential at an authentication server; providing a validation response from the authentication server to the authentication agent; forwarding the validation response from the authentication agent to the SSD; and executing the operational command based on the validation response.

The security credential may be a paraphrase.

The authentication agent may be a service that runs on a host computer to which the SSD is connected.

A device driver of the host computer may receive the operational command and manage a control and operations of the SSD.

A plurality of SSDs may be connected to a host computer. The method may further include: issuing a series of asynchronous events from the plurality of SSDs to the authentication agent.

The method may further include: establishing a secure communication channel between the authentication agent and the authentication server using a security scheme, wherein the security scheme is a secure sockets layer (SSL) or transport layer security (TLS).

The validation response may be provided from the authentication server to the authentication agent via an I/O control (IOCTL) call.

The SSD may be an Ethernet SSD that can be directly plugged into an Ethernet network.

The authentication server may inform the SSD of critical operations, and a critical operation checker issues the asynchronous event only for the critical operations to the authentication agent.

The operation command may be one of a format command, a deletion command, a creation command, and a resizing command for a namespace on a network-connected SSD.

The method may further include: storing a second security credential received from an administrator at a database of the authentication server; scanning an ID number of the SSD by the authentication agent during initialization; providing the ID number of the SSD from the authentication agent to the authentication server; generating the security certificate based on the second security credential received from the administrator at the authentication server; providing the security certificate to the authentication agent; and storing the security certificate in the SSD.

According to another embodiment, a method includes: receiving an operational command directed to a solid-state drive (SSD) from a user; posing challenge questions to the user; receiving user-provided answers to the challenge questions; comparing the user-provided answers and answers to the challenge questions associated with the user; and executing the operational command based on a comparison result between the user-provided answers and the answers.

The method may further include: issuing an asynchronous event to an authentication agent including an identifier of the user; forwarding the security credential from the authentication agent to an authentication server; and providing the challenge questions from the authentication server to the authentication agent and to the SSD.

The method may further include: issuing a second asynchronous event to the authentication agent including the user-provided answers; forwarding the user-provided answers from the authentication agent to an authentication server; validating the user-provided answers by comparing the user-provided answers with verified answers stored in the authentication server; providing a validation response from the authentication server to the authentication agent; forwarding the validation response from the authentication agent to the SSD; and executing the operational command based on the validation response.

According to another embodiment, a solid-state drive (SSD) includes one or more non-volatile memory devices; an interface to a host computer; and a firmware driver. The firmware driver is configured to: receive an operational command and a security credential via the interface; issue an asynchronous event to an authentication agent including the security credential and a security certificate, wherein the security certificate is encoded based on the security credential and is stored in the SSD; receive a validation response from the authentication agent; and execute the operational command based on the validation response.

The authentication agent may forward the security credential and the security certificate to an authentication server, and the authentication server may validate the security certificate based on a second security credential stored in the database of the authentication server and generate the validation response.

The SSD may be an Ethernet SSD that can be directly plugged into an Ethernet network.

The operation command may be one of a format command, a deletion command, a creation command, and resizing command for a namespace on a network-connected SSD.

The firmware driver may be further configured to: receive an initialization request from the authentication agent; provide an ID number to the authentication agent in response to the initialization request; receive the security certificate from the authentication agent; and store the security certificate in the SSD as a metadata.

According to yet another embodiment, an authentication system includes: an authentication server; a host computer running an authentication agent; and a plurality of SSDs. The authentication agent establishes a secure communication channel with the authentication server during initialization. Each of the plurality of SSDs includes a firmware driver that is configured to: receive an operational command and a security credential via a device driver running in the host computer; issue an asynchronous event to the authentication agent including the security credential and a security certificate, wherein the security certificate is encoded based on the security credential and is stored in the SSD. The authentication server is configured to validate the security certificate and provides a validation response to the authentication agent over the secure communication channel. The firmware driver of each of the plurality of SSDs is further configured to execute the operational command based on the validation response.

The firmware driver may be further configured to: receive an initialization request from the authentication agent; provide an ID number to the authentication agent in response to the initialization request; receive the security certificate from the authentication agent; and store the security certificate in the SSD as a metadata.

Each of the plurality of SSDs may be an Ethernet SSD that can be directly plugged into an Ethernet network.

The operation command may be one of a format command, a deletion command, a creation command, and resizing command for a namespace on a network-connected SSD.

The SSD may process a challenge and response as provided by the authentication server.

The above example embodiments have been described hereinabove to illustrate various embodiments of implementing a system and method for providing a system and method for authenticating critical operations on an SSD. Various modifications and departures from the disclosed example embodiments will occur to those having ordinary skill in the art. The subject matter that is intended to be within the scope of the invention is set forth in the following claims.

What is claimed is:

1. A method comprising:
   receiving, via a host computer, an operational command and a security credential associated with the operational command, wherein the operational command is directed to an Ethernet solid-state drive (SSD), and the operational command includes a non-volatile memory express (NVMe) over fabrics command;
   issuing an asynchronous event from the Ethernet SSD to an authentication agent, the asynchronous event including the security credential and a security certificate, wherein the security certificate is stored in the Ethernet SSD as being encoded by an authentication server using the security credential;
   forwarding the security credential and the security certificate from the authentication agent to the authentication server;
   decoding, at the authentication server, the security certificate using the security credential to obtain a decoded security certificate;
   validating, at the authentication server, the security certificate by comparing the decoded security certificate with a second security certificate that is stored in a database of the authentication server;
   providing a validation response from the authentication server to the authentication agent;
   forwarding the validation response from the authentication agent to the Ethernet SSD; and
   executing the operational command based on the validation response,
   wherein the authentication agent and the authentication server communicate over a network.

2. The method of claim 1, wherein the security credential is a paraphrase.

3. The method of claim 1, wherein the authentication agent is a service that runs on the host computer to which the Ethernet SSD is connected.

4. The method of claim 1, wherein a device driver of the host computer receives the operational command and manages a control and operations of the Ethernet SSD.

5. The method of claim 1, wherein a plurality of Ethernet SSDs are connected to the host computer, and the method further comprising:
   issuing a series of asynchronous events from the plurality of Ethernet SSDs to the authentication agent.

6. The method of claim 1, further comprising:
   establishing a secure communication channel between the authentication agent and the authentication server using a security scheme, wherein the security scheme is a secure sockets layer (SSL) or transport layer security (TLS).

7. The method of claim 1, wherein the validation response is provided from the authentication server to the authentication agent via an I/O control (IOCTL) call.

8. The method of claim 1, wherein the Ethernet SSD can be directly plugged into an Ethernet network.

9. The method of claim 1, wherein the authentication server informs the Ethernet SSD of critical operations, and wherein a critical operation checker issues the asynchronous event only for the critical operations to the authentication agent.

10. The method of claim 1, wherein the operational command is one of a format command, a deletion command, a creation command, and a resizing command for a namespace on the Ethernet SSD.

11. The method of claim 1, further comprising:
    scanning an ID number of the Ethernet SSD by the authentication agent during initialization;
    providing the ID number of the Ethernet SSD from the authentication agent to the authentication server; and
    generating the security certificate using the ID number of the Ethernet SSD as the security credential at the authentication server.

12. An Ethernet solid-state drive (SSD) comprising:
    one or more non-volatile memory devices;
    an interface to a host computer; and
    a firmware driver configured to:
      receive an operational command and a security credential associated with the operational command via the interface, wherein the operational command is directed to the Ethernet SSD, and the operational command includes a non-volatile memory express (NVMe) over fabrics command;
      issue an asynchronous event to an authentication agent, the asynchronous event including the security credential and a security certificate, wherein the security certificate is stored in the Ethernet SSD as being encoded by an authentication server using the security credential;
      receive a validation response from the authentication agent, the validation response being generated by decoding, at the authentication server, the security certificate using the security credential to obtain a decoded security certificate and comparing the decoded security certificate with a second security certificate that is stored in a database of the authentication server; and
      execute the operational command based on the validation response,
    wherein the authentication agent and the authentication server communicate over a network.

13. The SSD of claim 12, wherein the authentication agent forwards the security credential and the security certificate to the authentication server, and wherein the authentication server validates the security certificate based on a second security credential stored in the database of the authentication server and generates the validation response.

14. The Ethernet SSD of claim 12, wherein the Ethernet SSD can be directly plugged into an Ethernet network.

15. The Ethernet SSD of claim 12, wherein the operational command is one of a format command, a deletion command, a creation command, and resizing command for a namespace on the Ethernet SSD.

16. The Ethernet SSD of claim 12, wherein the firmware driver is further configured to:
receive an initialization request from the authentication agent;
provide an ID number to the authentication agent in response to the initialization request;
receive the security certificate from the authentication agent; and
store the security certificate in the Ethernet SSD as a metadata.

17. An authentication system comprising:
an authentication server;
a host computer running an authentication agent; and
a plurality of Ethernet SSDs connected to the host computer;
wherein the authentication agent establishes a secure communication channel with the authentication server during initialization,
wherein each of the plurality of Ethernet SSDs includes a firmware driver that is configured to:
receive an operational command and a security credential associated with the operational command via a device driver running in the host computer, wherein the operational command is directed to the Ethernet SSD, and the operational command includes a non-volatile memory express (NVMe) over fabrics command; and
issue an asynchronous event to the authentication agent, the asynchronous event including the security credential and a security certificate, wherein the security certificate is stored in the Ethernet SSD as being encoded by the authentication server using the security credential,
wherein the authentication server is configured to:
decode the security certificate using the security credential to obtain a decoded security certificate; and
validate the security certificate by comparing the decoded security certificate with a second security certificate that is stored in a database of the authentication server and provides a validation response to the authentication agent over the secure communication channel, and
wherein the firmware driver of each of the plurality of Ethernet SSDs is further configured to execute the operational command based on the validation response, and
wherein the authentication agent and the authentication server communicate over a network.

18. The authentication system of claim 17, wherein the firmware driver is further configured to:
receive an initialization request from the authentication agent;
provide an ID number to the authentication agent in response to the initialization request;
receive the security certificate from the authentication agent; and
store the security certificate in the Ethernet SSD as a metadata.

19. The authentication system of claim 17, wherein each of the plurality of Ethernet SSDs can be directly plugged into an Ethernet network.

20. The authentication system of claim 17, wherein the operational command is one of a format command, a deletion command, a creation command, and resizing command for a namespace on the Ethernet SSD.

21. The authentication system of claim 17, wherein the Ethernet SSD processes a challenge and response as provided by the authentication server.

* * * * *